United States Patent [19]
Hiyama

[11] 4,197,496
[45] Apr. 8, 1980

[54] PILOT SIGNAL TRANSMISSION SYSTEM

[75] Inventor: Takashi Hiyama, Tokyo, Japan

[73] Assignee: Nippon Electric Co., Ltd., Tokyo, Japan

[21] Appl. No.: 909,084

[22] Filed: May 24, 1978

[30] Foreign Application Priority Data

May 26, 1977 [JP] Japan .................................. 52/61940
Jun. 9, 1977 [JP] Japan .................................. 52/68602

[51] Int. Cl.² .............................................. H04B 1/40
[52] U.S. Cl. ........................................ 455/16; 370/74; 370/98; 179/170 A
[58] Field of Search ............................... 325/1, 2, 4, 5; 179/15 BN, 16 A, 170 A, 170 R, 170 F

[56] References Cited

U.S. PATENT DOCUMENTS

| | | | |
|---|---|---|---|
| 2,892,930 | 6/1959 | Magnuski .................................. | 325/1 |
| 3,456,191 | 7/1969 | Rodenburg .............................. | 325/2 |
| 3,470,498 | 9/1969 | Serrure ............................. | 179/170 A |
| 3,974,447 | 8/1976 | Löfmark .................................. | 325/1 |

*Primary Examiner*—Robert L. Griffin
*Assistant Examiner*—Michael A. Masinick

*Attorney, Agent, or Firm*—Sughrue, Rothwell, Mion, Zinn and Macpeak

[57] ABSTRACT

A pilot signal transmission system is disclosed in which two terminal stations transmit signals including link monitoring pilot signals to each other directly or through a repeater station. The terminal stations include a pilot signal switching section responsive to a detection signal from a transmitting pilot detecting section for operating in such a manner that if the detection signal is normal it transmits the output of the pilot transmitting section to the transmitting section, while if the detection signal is abnormal it transmits the output of the filtering section to the transmitting section. In the case of a repeater station, up and down pilot switching sections are responsive to detection signals from the receiving pilot detecting sections for operating in such a manner that the pilot signals filtered by the pilot filtering sections may be either transmitted to the transmitting sections or interrupted, the receiving pilot signal being repeatered jointed with the demodulated signal from the receiving section if the detection signal is normal, while the receiving pilot signal for the opposite direction link being repeatered jointly with the demodulated signal from the receiving section if the detection signal is abnormal.

4 Claims, 10 Drawing Figures

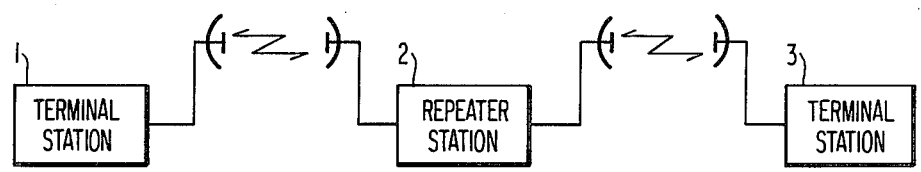
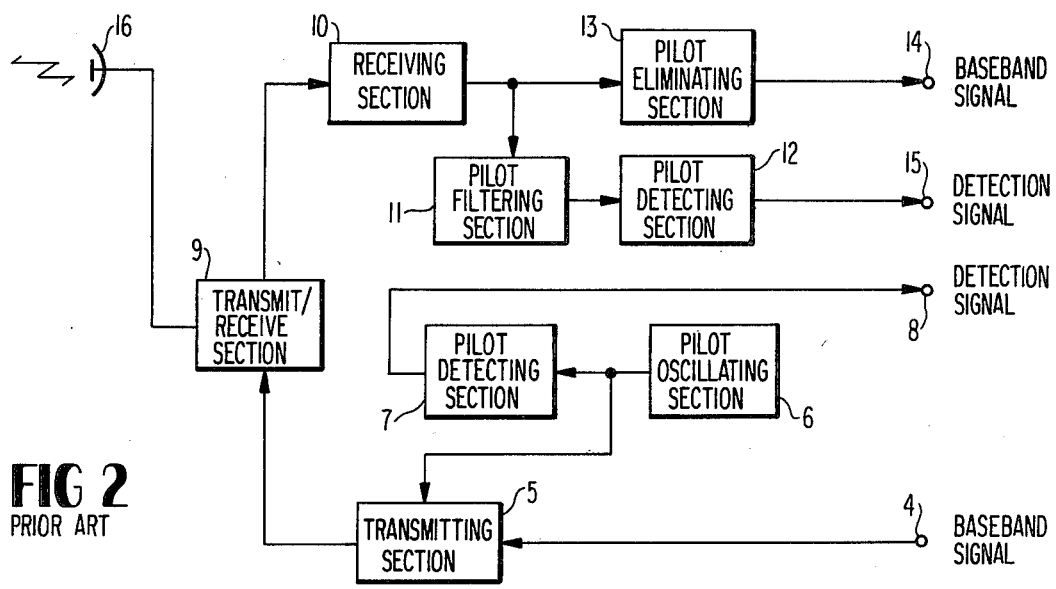
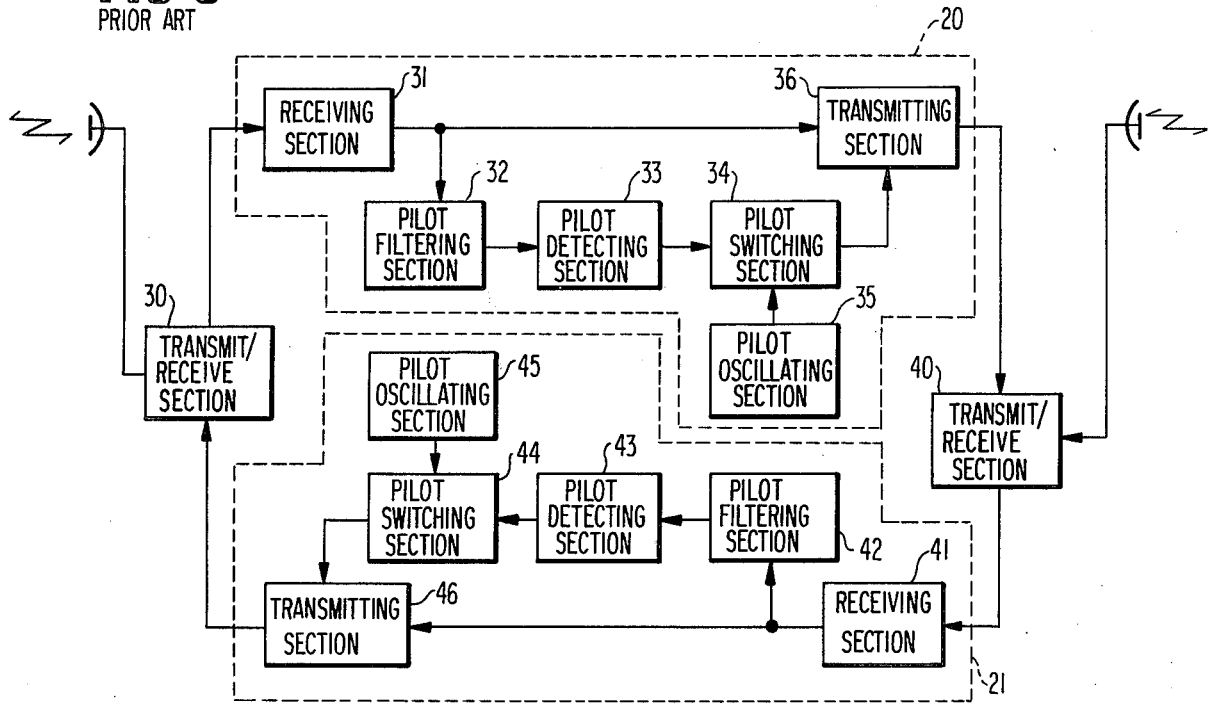

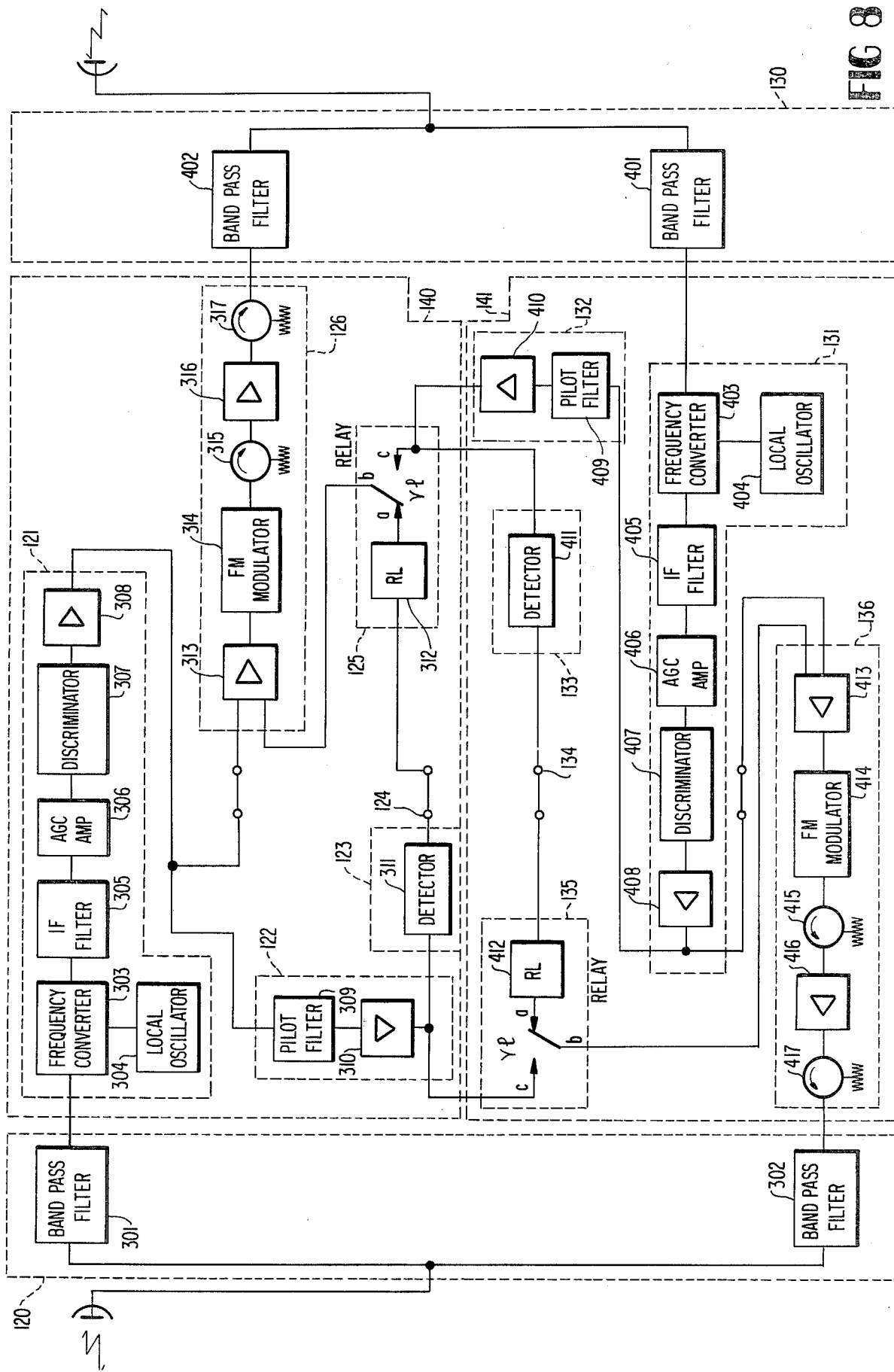

PILOT SIGNAL TRANSMISSION SYSTEM

BACKGROUND OF THE INVENTION

The present invention relates to a signal transmission system and, more particularly to a pilot signal transmission system in which two terminal stations transmit signals including link monitoring pilot signals (referred to as pilot signals hereunder) with carrier waves to each other either directly or through a repeater station.

In general, a radio terminal station (terminal station) is composed of a radio transmitting section (transmitting section), a radio receiving section (receiving section), a pilot oscillating section for generating a pilot signal (transmitting pilot signal) to be fed to said transmitting section, a transmitting pilot signal detecting section for detecting the output of said pilot oscillating section, a pilot filtering section for filtering a pilot signal (receiving pilot signal) included in the signal demodulated in said receiving section, and a receiving pilot detecting section for detecting the output level of said pilot filtering section. In such a terminal station, it is a common practice to provide either only one pilot oscillating section to be used currently (examples of this type are FM72-400 Radio Equipment manufactured by Siemens Aktiengesellschaft and CTR145C Signal Tranceiver manufactured by GTE International Incorporation) or two pilot oscillating sections, one for current use and the other for standby.

On the other hand, a radio baseband repeater station (repeater station) is generally composed of, for the up- and down-links, two transmitting sections, two receiving sections, two receiving pilot filtering sections for filtering receiving pilot signals, and two receiving pilot detecting sections for detecting output levels of said pilot filtering sections. Conventional systems employed in this repeater station for repeating the signals demodulated to the transmitting sections include the one in which the demodulated signals is repeatered after the pilot signals contained therein have been removed by pilot removing sections, and another one in which the demodulated signals (containing the pilot signals) are repeatered themselves.

What is common to the terminal station and the repeater station in the prior art is that the transmitting pilot signal, the receiving pilot signal and the pilot signals on the up- and down-links are handled independently of each other.

The aforementioned conventional terminal station has disadvantages in that if there is provided only one pilot oscillating section to be used currently, it will become impossible to monitor the transmission path upon fault of the pilot oscillating section, and if two pilot oscillating sections are provided with one of them for standby, the apparatus as a whole is costly to manufacture and requires a greater space to install.

The above-described conventional repeater station also has disadvantages in that in the case where the demodulated signals are repeatered after the pilot signals have been eliminated, pilot eliminating sections are necessitated so that one or two pilot oscillating sections for feeding transmitting pilot signals to the transmitting sections for the up- and down-links become necessary, while in the case where the demodulated signals are repeatered in themselves, it will become impossible to monitor a transmission path upon fault of a pilot oscillating section in a terminal station or upon fault of a receiving section in the repeater station, so that as a standby source of the pilot signals which are normally transmitted from the terminal stations via the up- and down-links, a pilot oscillating section must be provided in the repeater station.

SUMMARY OF THE INVENTION

It is one object of the present invention to provide a pilot signal transmission system in which the aforementioned disadvantages of the conventional terminal station are eliminated by merely providing a single pilot oscillating section therein.

Another object of the present invention is to provide a pilot signal transmission system in which the aforementioned disadvantages of the conventional repeater station are eliminated without providing a pilot oscillating section therein.

According to one feature of the present invention, there is provided a terminal station which comprises, in addition to the aforementioned construction, a pilot switching section responsive to a detection signal from the transmitting pilot detecting section for operating in such manner that if the detection signal is normal, it transmits the output of the pilot transmitting section to the transmitting section, while if the detection signal is abnormal it transmits the output of the pilot filtering section to the transmitting section, whereby the aforementioned disadvantages can be eliminated.

According to another feature of the present invention, there is provided a repeater station which comprises, in addition to the aforementioned construction, up and down pilot switching sections responsive to detection signals from the receiving pilot detecting sections for the up- and down-links, respectively, for operating in such manner that the pilot signals filtered by the pilot filtering sections may be either transmitted to the transmitting sections or interrupted, the receiving pilot signal being repeatered jointly with the demodulated signal from the receiving section if the detection signal is normal, while the receiving pilot signal for the opposite direction link being repeatered jointly with the demodulated signal from the receiving section if the detection signal is abnormal.

BRIEF DESCRIPTION OF THE DRAWINGS

The above-mentioned and other features and objects of this invention will become more apparent by reference to the following description taken in conjunction with the accompanying drawings, in which:

FIG. 1 is a block diagram of one example of a radio communication link;

FIG. 2 is a block diagram of one example of a radio terminal station in the prior art;

FIGS. 3 and 4 are block diagrams of examples of radio repeaters in the prior art;

FIG. 8 is a more detailed block diagram of a radio repeater station according to the present invention;

DETAILED DESCRIPTION OF THE INVENTION

Figure 4:
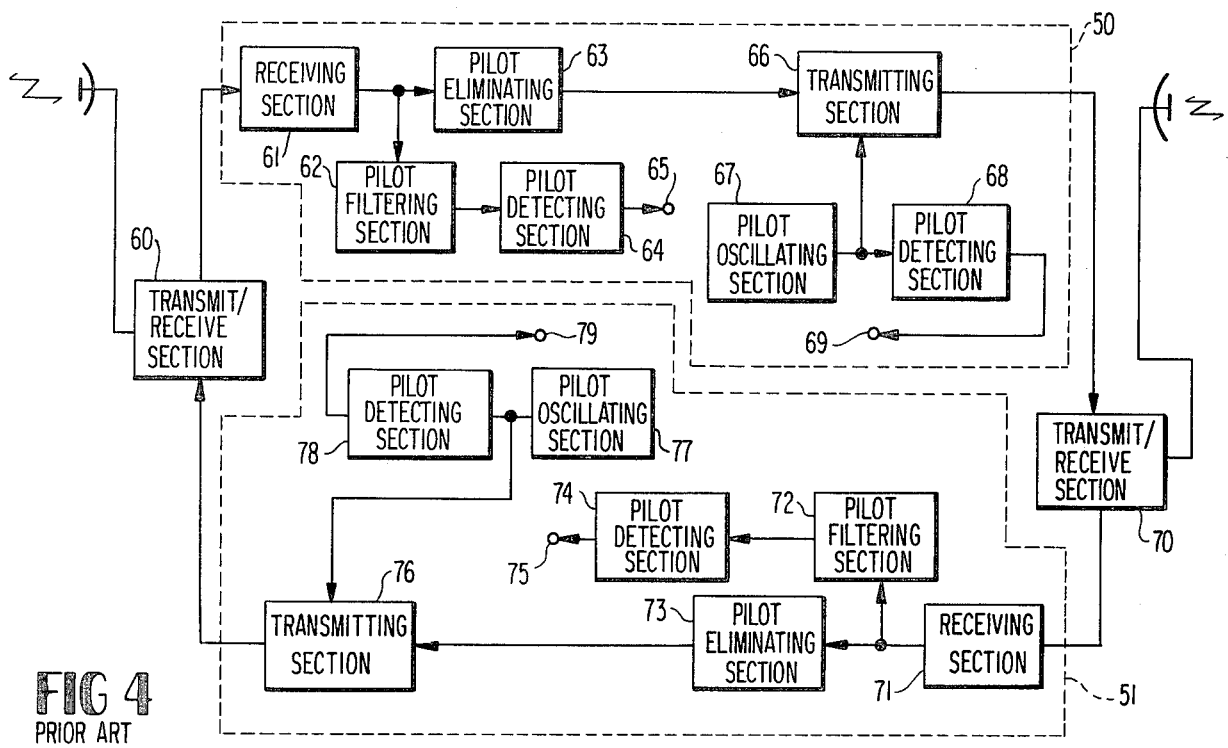

Referring now to FIG. 1, a radio carrier wave modulated with a signal containing a pilot signal is transmitted from a terminal station 1 (or 3). At a repeater station 2, this modulated radio wave is received and demodulated, and after it has been again converted into a modulated radio wave it is transmitted to a terminal station 3 (or 1). At the terminal station 3 (or 1), this modulated radio wave is received and the aforementioned signal is demodulated from the received modulated radio wave. The operations of these terminal stations and repeater station will be described in greater detail with reference to FIGS. 2, 3 and 4.

In the terminal station shown in FIG. 2, a baseband signal fed from a terminal 4 and a pilot signal fed from a pilot oscillating section 6 are combined in a transmitting section 5, and after a radio carrier wave has been modulated with this combined signal, the modulated carrier wave is passed through a transmit/receive section 9 and is transmitted from an antenna 16 to the radio repeater station 2. The output of the pilot oscillating section 6 is detected by a transmitting pilot detecting section 7 and the detection signal is sent to a terminal 8. With this detection signal, it can be checked whether the pilot oscillating section 6 is normal or abnormal.

On the other hand, a modulated wave from the repeater station 2 is received by the antenna 16 and passes through the transmit/receive section 9, and then the baseband signal and pilot signal are demodulated in a receiving section 10. Only the pilot signal in demodulated signal is eliminated by a pilot eliminating section 13 to allow only the baseband signal to be outputted from a terminal 14. In addition, only the pilot signal in the demodulated signal is filtered by a pilot filtering section 11 to allow the filtered pilot signal to be detected by a receiving pilot detecting section 12, which sends a detection signal to a terminal 15. With this detection signal, it can be determined whether the radio communication link comprising the terminal stations and the repeater station is in a normal operation or not. Such a conventional terminal station has the aforementioned disadvantages.

One example of a conventional repeater station is shown in FIG. 3, in which reference numerals 20 and 21 designate receiver/transmitter apparatuses for down- and up-links, respectively, and numerals 30 and 40 designate transmit/receiver sections, respectively, on the opposite sides of the repeater station. The receiver/transmitter apparatus 20 (or 21) is composed of a receiving section 31 (or 41), a pilot filtering section 32 (or 42), a receiving pilot detecting section 33 (or 43), a pilot switching section 34 (or 44), a pilot oscillating section 35 (or 45) and a transmitting section 36 (or 46). In FIG. 3, a modulated radio wave (a carrier wave modulated with a baseband signal and a pilot signal) transmitted from the terminal station shown in FIG. 2 is received by an antenna and passed through the transmit/receive section 30 (or 40), and has the baseband signal and the pilot signal demodulated in the receiving section 31 (or 41), and these signals are fed to the transmitting section 36 (or 46) to be converted again into a modulated wave, which is passed through the transmit/receive section 40 (or 30) and transmitted from an antenna to the other terminal station. A pilot signal in the demodulated signal fed from the receiving section 31 (or 41) is only filtered by the pilot filtering section 32 (or 42), the filtered pilot signal being detected by the receiving pilot detecting section 33 (or 43), and the detection signal controls the pilot switching section 34 (or 44) in such manner that if the detection signal is abnormal, a pilot signal fed from the pilot oscillating section 35 (or 45) may be fed to the transmitting section 36 (or 46).

Another example of the conventional repeater station is shown in FIG. 4, in which reference numerals 50 and 51 designate receiver/transmitter apparatuses for down- and up-links, respectively (the frequency difference between the up- and down-links being, for example, 35 MHz), and numerals 60 and 70 designate transmit/receive sections, respectively, on the opposite sides of the repeater station. The receiver/transmitter apparatus 50 (or 51) is composed of a receiving section 61 (or 71), a pilot filtering section 62 (or 72), a pilot eliminating section 63 (or 73), a receiving pilot detecting section 64 (or 74), detection signal output terminals 65, 69 (or 75, 79), a transmitting section 66 (or 76), a pilot oscillating section 67 (or 77) and a transmitting pilot detecting section 68 (or 78). The repeater station shown in FIG. 4 consists of two terminal stations each of which is shown in FIG. 2, the input and output terminals for the baseband signal of one terminal station being connected, respectively, to the output and input terminals for the baseband signal of the other terminal station. Therefore, the operation of this repeater station will be easily understood from the explanation of the operations of the terminal station in FIG. 2.

The disadvantage of the conventional terminal station and repeater station as described previously, are caused by the fact that the pilot signals on the up- and down-links are handled quite independently of each other.

Now a terminal station and a repeater station according to the invention will be described in detail.

Figure 5:
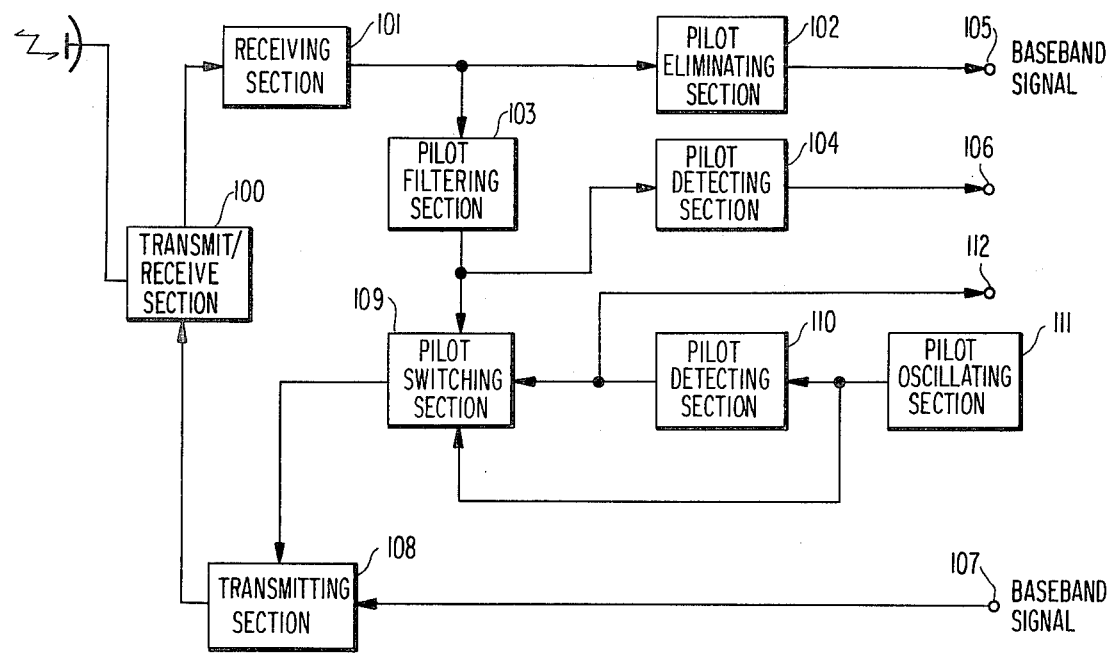
FIG. 5 is a block diagram of a radio terminal station according to the present invention.

In a terminal station shown in FIG. 5, a pilot signal level of a pilot oscillating section 111 is detected by a transmitting pilot detecting section 110 to actuate a pilot switching section 109 in response to the detection signal derived from the transmitting pilot detecting section 110 so that the pilot signals from the pilot oscillating section 111 and from a pilot filtering section 103 may be switched and selectively sent to a transmitting section 108, where the pilot signal is combined with a baseband signal fed from a terminal 107 and a radio carrier wave is modulated with the combined signal, and then the modulated radio wave is passed through a transmit/receive section 100 and is transmitted from an antenna to a repeater station. On the other hand, at the other terminal station, a radio modulated wave transmitted from the repeater station is received by an antenna, passed through the transmit/receive section 100 and demodulated into a baseband signal and a pilot signal in a receiving section 101. The pilot signal in the modulated signal is only eliminated by a pilot eliminating section 102, to allow only the baseband signal to be outputted at a terminal 105. The pilot in the demodulated signal is only filtered by a pilot filtering section 103, a part of the filtered signal being sent to a pilot switching section 109 as a standby source of a pilot signal to be substituted for a pilot oscillating section 111, and the remainder of the filtered signal is detected by a receiving pilot detecting section 104 to be utilized at a terminal 106 as a receiving pilot signal alarm or the like. In this terminal station, as a matter of course, upon fault of the pilot oscillating section 111, the pilot switching section 109 is actuated so as to send the pilot signal fed from the pilot filtering section 103 to the transmitting section 108.

Figure 6:
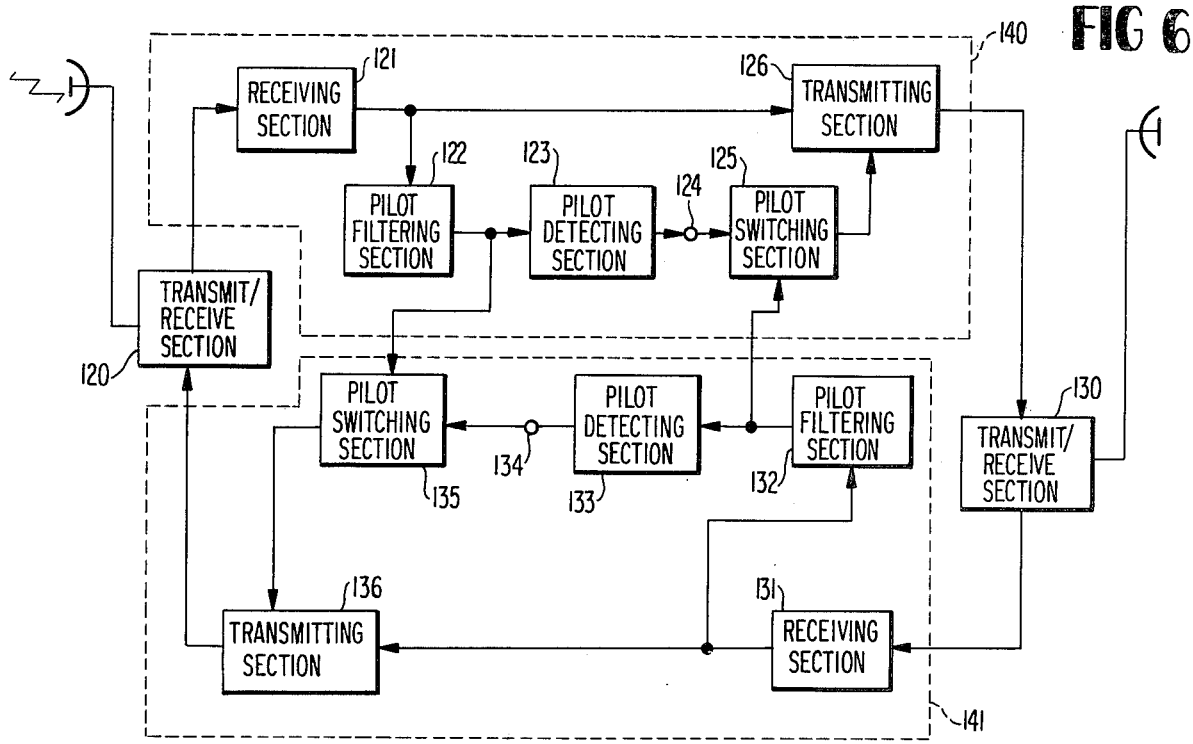
FIG. 6 is a block diagram of a radio repeater station according to the present invention.

In a repeater station shown in FIG. 6, a radio modulated wave transmitted from a terminal station is received by an antenna and is passed through a transmit/-receive section 120 (or 130), and after it has been once demodulated in a receiving section 121 (or 131), the demodulated signal is fed to a transmitting section 126 (or 136) to be converted again into a radio modulated wave, which is passed through a transmit/receive section 130 (or 120) and transmitted from an antenna to the other terminal station. The pilot signal in the demodulated signal derived from the receiving section 121 (or 131) is only filtered by a pilot filtering section 122 (or 132), the receiving pilot signal level of the filtered pilot signal being detected by a receiving pilot detecting section 123 (or 133), and a pilot switching section 125 (or 135) is actuated by the detection signal derived from the receiving pilot detecting section 123 (or 133). A part of the output from the pilot filtering section 122 (or 133) is fed to a pilot switching section 135 (or 125), and the filtered pilot signal is adapted to be sent to a transmitting section 136 (or 126) through the pilot switching section 135 (or 125) which is actuated by a detection signal derived from a receiving pilot detecting section 133 (or 123), if it is desired. More particularly, if the pilot signal filtered by the pilot filtering section 122 (or 132) is abnormal, then the pilot switching section 125 (or 135) is actuated by the detection signal derived from the receiving pilot detecting section 123 (or 133) so as to send the pilot signal fed from the pilot filtering section 132 (or 122) to the transmitting section 126 (or 136).

Now the construction and operation of the terminal station and repeater station according to the present invention will be described in more detail with reference to FIGS. 7 and 8. In these figures, blocks designated by numbers of one hundreds correspond to the blocks designated by the same reference numerals in FIGS. 5 and 6.

Figure 9:
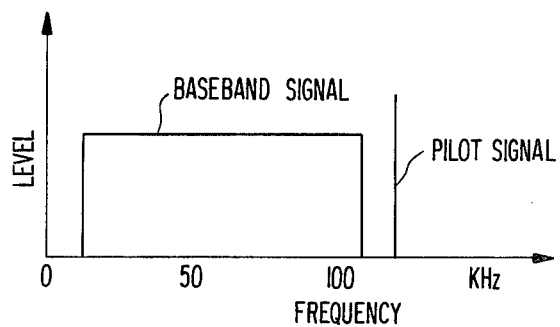
FIG. 9 shows one example of a spectrum of a baseband signal and a pilot signal.
Figure 7:
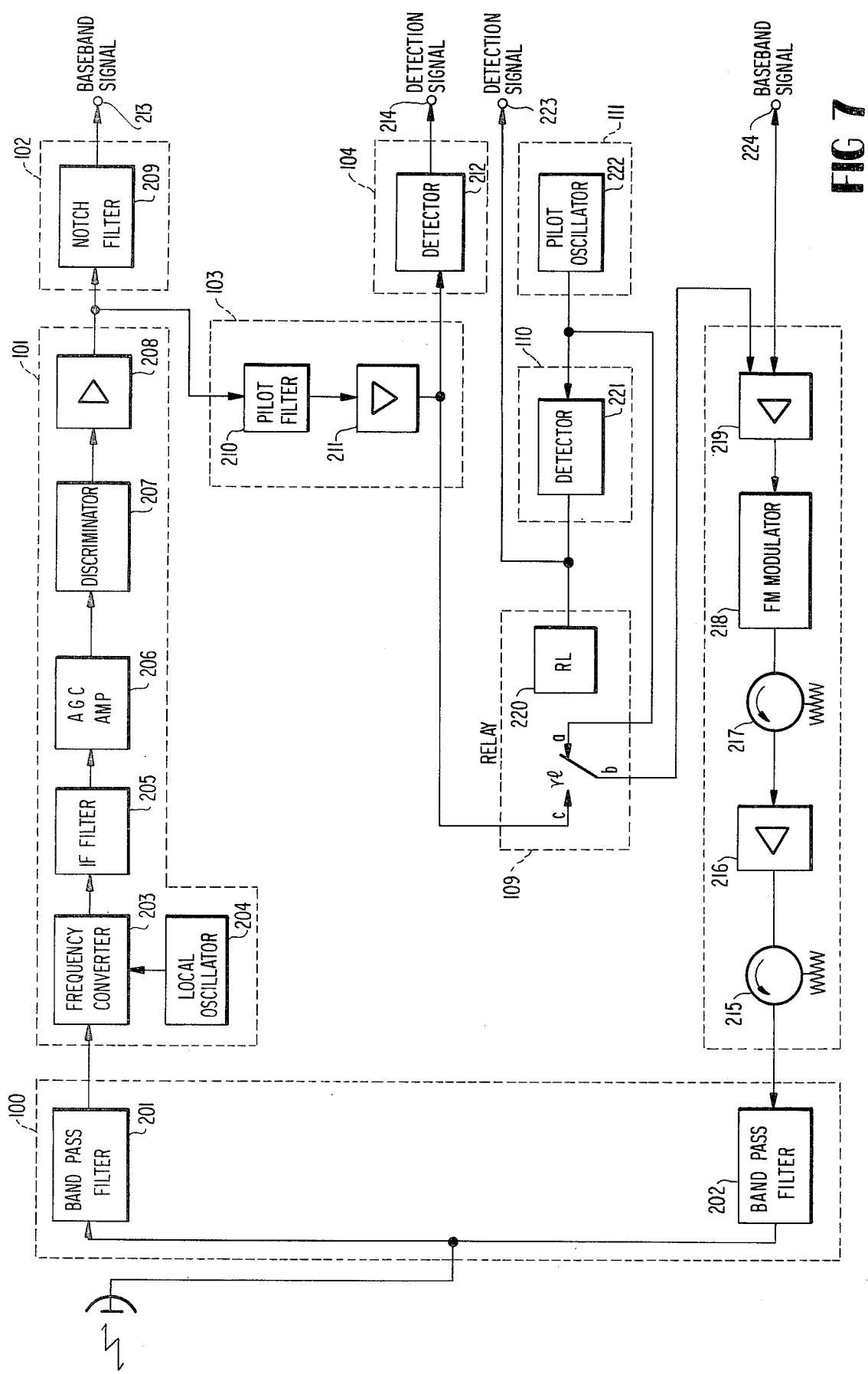
FIG. 7 is a more detailed block diagram of a radio terminal station according to the present invention.

In a terminal station shown in FIG. 7, to a terminal 224 is generally inputted a baseband signal (for instance, in the case of FDM 24 CH, 12~108 KHz) transmitted from a carrier frequency terminal office, which is combined and amplified with a pilot signal (for instance, in the case of FDM 24 CH, 119 KHz) fed from a pilot switching section 109 in a baseband signal amplifier 219. The spectrum of the output of the baseband signal amplifier 219 is, for example, as shown in FIG. 9. Subsequently, in a FM modulator 218 employing a variable capacitor which is oscillating at a radio frequency, the radio wave is frequency-modulated with the baseband signal and the pilot signal in combination, and after it has been amplified to a desired power level by a power amplifier 216, it has harmonic components of the transmitting frequency eliminated by a bandpass filter 202 and is transmitted from an antenna to a repeater station. It is to be noted that circulators 215 and 217 are used for protection of the modulation characteristics and protection of a power transistor, and that design is made such that the impedances of the receiving frequency bandpass filter 201 and the transmitting frequency bandpass filter 202 as viewed from the junction between the antenna terminal and the transmit/receive section 100 are respectively in an OPEN state with respect to the transmitting frequency and the receiving frequency, respectively. A radio wave transmitted from a repeater station is received by an antenna, filtered by a receiving frequency bandpass filter 201 to eliminate an external noise, and inputted to a frequency converter 203 jointly with a local signal fed from a local oscillator 204 to be converted into an intermediate frequency (for example, 35 MHz). Subsequently, the intermediate frequency signal with the signal bandwidth is only filtered by an intermediate frequency filter 205, and after the output level has been kept at a constant level by an automatic gain control amplifier 206, a signal proportional to a frequency deviation is demodulated by a frequency discriminator 207, and then it is amplified up to a desired level by means of a baseband signal amplifier 208. The spectrum of the demodulated output is reproduced as shown in FIG. 9. The pilot signal is only eliminated from the demodulated signal by notch filter 209, and thereafter it is transmitted from a terminal 213 to a carrier terminal office. The pilot signal in the demodulated signal is only filtered by a pilot filter 210 which can sufficiently attenuate (about 70 dB or higher) the signals other than the pilot signal, and thereafter the pilot signal is amplified up to a predetermined level by means of a pilot signal amplifier 211. A part of the amplified pilot signal is sent to a contact c of relay contacts rl in a pilot switching section 109, and the remainder of the amplifier pilot signal is fed to a receiving pilot detector 212 to determine if the pilot signal exists or not. On the other hand, a pilot signal fed from a pilot oscillator 222 is sent to a contact a of the relay contacts rl in the pilot signal switching section 109, and is detected by a transmitting pilot detector 221, which either energizes or de-energizes a relay winding RL 200 in the pilot switching section 109 depending upon whether the transmitting pilot signal exists or not, and also sends a signal representing existence or non-existence of the transmitting pilot signal to a terminal 223. Therefore, depending upon the excitation state of the relay winding RL 200, a movable contact b is connected to a fixed contact a or c in the relay contacts rl. In case where the output level of the pilot oscillator 222 is normal, the relay winding RL 200 is energized by the detection signal fed from the transmitting pilot detector 221 corresponding to the normal state, so that the movable contact b is connected to the fixed contact a, and accordingly, the pilot signal fed from the pilot oscillator 222 is sent to the baseband signal amplifier 219. In case where the output level of the pilot oscillator 222 is abnormal, the relay winding RL 200 is de-energized by the detection signal fed from the transmitting pilot detector 221 corresponding to the abnormal state, so that the movable contact b is connected to the fixed contact c, and accordingly, the pilot signal fed from the pilot filtering section 103 is sent to the baseband signal amplifier 219 in the transmitting section 108.

In a repeater station shown in FIG. 8, a modulated radio wave transmitted from the terminal station is received by an antenna, filtered by a receiving frequency bandpass filter 301 (or 401) to eliminate external noise, and inputted to a frequency converter 303 (or 403) jointly with a local signal fed from a local oscillator 304 (or 404) to be converted into an intermediate frequency. Subsequently, the intermediate frequency in signal with the signal bandwidth is only filtered by an intermediate frequency filter 305 (or 405), and after the output level has been kept at a constant level by an automatic gain control amplifier 306 (or 406), a signal proportional to a frequency deviation is demodulated by a frequency discriminator 307 (or 407), and then it is amplified up to a desired level by means of a baseband signal amplifier 308 (or 408). The spectrum of the demodulated output is as shown in FIG. 9. This demodulated signal is amplified by a baseband signal amplifier 313 (or 413), converted again into a radio modulated wave by an FM modulator 314 (or 414), and amplified up to a desired power level by means of a power amplifier 316 (or 416). Thereafter, only the transmitting frequency is filtered by a transmitting frequency bandpass filter 402 (or 302), and is transmitted from an antenna to the other terminal station. On the other hand, the pilot signal in demodulated signal from the receiving section 121 (or 131) is only filtered by a pilot filter 309 (or 409), and after the filtered pilot signal has been amplified up to a predetermined level by a pilot signal amplifier 310 (or 410), a part of the amplified pilot signal is sent to a fixed contact c of relay contacts rl in the pilot switching section 135 (or 125), the remainder of the pilot signal is fed to a receiving pilot detector 311 (or 411) to detect whether the pilot signal exists or not, and the detection signal from the receiving pilot detector 311 (or 411) is sent to a pilot switching section 125 (or 135) to energize a relay winding RL 312 (or 412) therein. In case where the output level of the pilot signal from the pilot filtering section 122 (or 132) is normal, the relay winding RL 312 (or 412) is energized by the detection signal fed from the pilot detector 311 (or 411) in accordance with the normal state, so that the movable contact b is connected to the fixed contact a to interrupt the path of the pilot signal extending from the pilot filtering section 132 (or 122) to the transmitting section 126 (or 136). In case where the output level of the pilot signal from the pilot filtering section 122 (or 132) is abnormal, the relay winding RL 312 (or 412) is energized by the detection signal fed from the pilot detector 311 (or 411) in accordance with the abnormal state, so that the movable contact b is connected to the fixed contact c to feed the pilot signal from the pilot filtering section 132 (or 122) to the baseband signal amplifier 313 (or 413), whereby the pilot signal fed from the pilot filtering section 132 (or 122) is combined with the baseband signal fed from the receiving section 121 (or 131), and then the combined signal is applied to the FM modulator 314 (or 414). It is to be noted that circulators 315 and 317 (or 415 and 417) in the transmitting section 126 (or 136) are provided for the same purpose as explained in connection to the circulators 215 and 217 in the terminal station shown in FIG. 7.

As described above, if the transmitting and receiving pilot signals are handled in a correlated manner in the terminal station, and if the pilot signals on the up- and down-links are handled in a correlated manner in the repeater station, then the disadvantages inherent to the conventional pilot signal transmission systems, can be eliminated. More particularly, if a receiving pilot signal is used as a standby source to be substituted for a pilot oscillator in a terminal station, then link monitoring equivalent to that achieved by a terminal station having two conventional pilot oscillators, can be accomplished by the provision of only one pilot signal oscillator in a terminal station. Likewise, in a repeater station, link monitoring equivalent to that achieved by a repeater station provided with one or two conventional pilot oscillators, can be accomplished by employing a pilot signal filtered by a pilot filtering section on an up-link (or a down-link) as a standby signal to be substituted for a pilot signal on a down-link (or an up-link), without the provision of any pilot oscillator in the repeater station. Therefore, according to the present invention, the total number of the pilot oscillators necessitated in a radio communication link as illustrated in FIG. 1 is only two. It is to be noted that in the pilot signal transmission system according to the present invention as described above, any number of repeater stations could be connected in series in the transmission system, or else, two terminal stations could be connected for communication directly to each other by eliminating the repeater station. Still further, the repeater station according to the present invention could be used in combination with a terminal station or stations in the prior art.

In the pilot signal transmission system according to the present invention, if the pilot oscillator in the two terminal stations (for example, 1 and 3 in FIG. 1) should become faulty (although such faults are very scarce), then in the radio communication link illustrated in FIG. 1, the relays in the pilot switching sections in both the terminal station and the repeater station are actuated resulting in a closed loop with respect to the pilot signal, and so there is a fear that oscillation may arise in the closed loop at a frequency near to the frequency of the pilot signal. Therefore, according to one aspect of the present invention, provision can be made such that the radio communication link may not form a closed loop with respect to the pilot signal by actuating the relay in the pilot switching section in the terminal station so that the transmitting section may not be connected to the pilot filtering section if both the transmitting pilot detecting section and the receiving pilot detecting section have detected abnormal states of the transmitting and receiving pilot signals, and by actuating the relays in the pilot switching sections in the repeater station so that the pilot filter sections may not be connected to the transmitting sections for the opposite direction if both the receiving pilot detecting sections have detected abnormal states of the receiving pilot signals.

Figure 10:
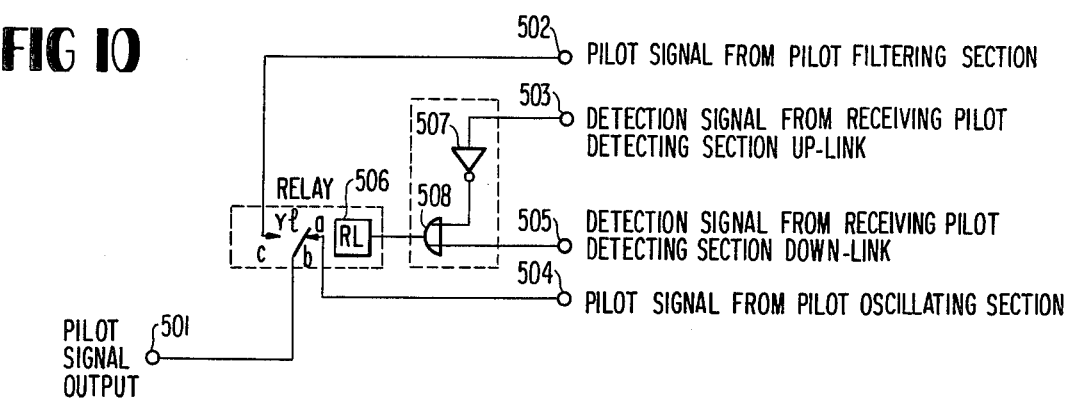
FIG. 10 shows an alternative example of a switching section to be used according to the present invention.

Now the operation of the relay in the pilot switching section in such a modified embodiment will be described with reference to FIG. 10. In this figure, a terminal 501 is an output terminal of a pilot signal to be fed to a transmitting section in a terminal station or a transmitting section for a down-link (or an up-link) in a repeater station, a terminal 502 is an input terminal of a pilot signal to be fed from a pilot filtering section in a terminal station or a pilot filtering section for an up-link (or a down-link) in a repeater section, a terminal 504 is an input terminal of a pilot signal to be fed from a pilot oscillating section in a terminal station (in the case of a repeater station, nothing is connected to this terminal 504), a terminal 503 is an input terminal of a detection signal derived from a receiving pilot detecting section in a terminal station or a receiving pilot detecting section for an up-link (or a down-link) in a repeater station, and a terminal 505 is an input terminal of a detection signal derived from a transmitting pilot detection section in a terminal station or a receiving pilot detecting section for a down-link (or an up-link) in a repeater station, and in this case it is assumed that the logic values of the respective detection signals are "1" in case where the pilot signal level is normal and "0" in case where it is abnormal, and that a relay 506 operates in such manner that a contact a may be connected to a movable contact b if the logic value at the output of an OR-gate 508 is "1", while a contact c may be connected to the movable contact b if the logic value at the output of OR-gate 508 is "0". More particularly, the logic operations of the relay 506 are as shown in Table 1, in which if both the detection signals for the pilot signals appearing at the terminals 503 and 505 are "0", then the output of the OR-gate 508 becomes "1" due to insertion of an inverter 507, so that the relay 506 does not connect the movable contact b to the contact c, resulting in an open loop with respect to the signal including the pilot signal in the radio communication link. In other words, the oscillation at a frequency near to the frequency of the pilot signal generated in the closed loop consisting of the route in which a noise component in the demodulated signal in the terminal station filtered by the pilot filtering section is transmitted from a transmitting section, demodulated in the receiving section for the up-link (or down-link) in the repeater station, filtered by the pilot filtering section, then transmitted from the transmitting section for the down-link (or up-link) and again demodulated in the receiving section of the same terminal station, can be prevented.

TABLE 1

| Detection Signal Level at Terminal 505 | Detection Signal Level at Terminal 503 | Output Level of OR-gate 508 |
|---|---|---|
| 0 | 0 | 1 |
| 0 | 1 | 0 |
| 1 | 0 | 1 |
| 1 | 1 | 1 |

What is claimed is:

1. In a pilot signal transmission system of the type having two terminal stations for transmitting signals including pilot signals with carrier waves, at least one of said terminal stations having transmitting means receiving baseband signals and pilot signals for transmitting said signals including pilot signals with carrier waves, pilot signal generating means for generating said pilot signals as an output to be supplied to said transmitting means, receiving means for receiving said signals including pilot signals with carrier waves and providing an output, and extracting means connected to said receiving means for extracting said pilot signals from the output of said receiving means and providing said pilot signals as an output, the improvement comprising:

detecting means connected to the output of said pilot signal generating means for generating a control output, and switching means having two inputs respectively connected to the outputs of said pilot signal generating means and said extracting means and responsive to the control output of said detecting means for supplying one or the other of the outputs of said pilot signal generating means or extracting means as the pilot signals to be supplied to said transmitting means.

2. The improvement in a pilot signal transmission system as recited in claim 1 further comprising:

second detecting means connected to the output of said extracting means for generating a second control output, and logic means responsive to the control outputs of both detecting means for preventing the feeding of the output of said extracting means to said transmitting means when the pilot signal generating means in said two terminal stations simultaneously fail.

3. In a pilot signal transmission system of the type having first and second terminal stations including first and second transmitting sections, respectively, and first and second receiving sections, respectively, and a repeater station including third and fourth receiving sections and third and fourth transmitting sections, for transmitting a first signal including a pilot signal from said first transmitting section through a first carrier transmission link via said third receiving section and said third transmitting section to said second receiving section, and for transmitting a second signal including a pilot signal from said second transmitting section through a second carrier transmission link through said fourth receiving section and said fourth transmitting section to said first receiving section, said third receiving section having an output connected to an input of said third transmitting section, said fourth receiving section having an output connected to an input of said fourth transmitting section, said third and fourth transmitting sections each further having pilot signal inputs, the improvement in said repeater station comprising:

first and second extracting means respectively connected to said third and fourth receiving sections for extracting said pilot signals from the outputs of said third and fourth receiving sections and providing respective pilot signal outputs, first and second detecting means connected respectively to the outputs of said first and second extracting means for generating respective control outputs, first switching means responsive to the control output of said second detecting means for selectively feeding the output of said first extracting means to the pilot signal input of said fourth transmitting section, and second switching means responsive to the control output of said first detecting means for selectively feeding the output of said second extracting means to the pilot signal input of said third transmitting section.

4. The improvement in a pilot signal transmission system as recited in claim 3, further comprising logic means responsive to the control outputs of said first and second detecting means for preventing the simultaneous feeding of the output of said second extracting means to said third transmitting section and feeding the output of said first extraction means to said fourth transmitting section.

* * * * *

UNITED STATES PATENT AND TRADEMARK OFFICE
CERTIFICATE OF CORRECTION

PATENT NO. : 4,197,496
DATED : April 8, 1980
INVENTOR(S) : Takashi HIYAMA

It is certified that error appears in the above—identified patent and that said Letters Patent are hereby corrected as shown below:

IN THE ABSTRACT:

Lines 17-18 "repeatered jointed" should read

--repeatered jointly--

IN THE SPECIFICATION:

Column 5, line 20, delete "(or 133)" insert --(or 132)--

Signed and Sealed this

Twenty-ninth Day of July 1980

[SEAL]

Attest:

SIDNEY A. DIAMOND

Attesting Officer           Commissioner of Patents and Trademarks